United States Patent Office 3,772,251
Patented Nov. 13, 1973

3,772,251
AROMATIC FLUOROALIPHATIC-LINKED
POLYSULFONATE ESTERS
Harvey A. Brown, Lake Elmo, Minn., assignor to Minnesota Mining and Manufacturing Company, St. Paul, Minn.
No Drawing. Filed Oct. 30, 1972, Ser. No. 301,836
Int. Cl. C08g 5/02
U.S. Cl. 260—49
2 Claims

ABSTRACT OF THE DISCLOSURE

Aromatic fluoroaliphatic-linked polysulfonate esters.

DETAILED DESCRIPTION

This invention relates to aromatic fluoroaliphatic-linked polysulfonate esters.

It is an object of this invention to provide certain novel aromatic fluoroaliphatic-linked polysulfonate esters.

It is another object of the invention to provide a class of thermoplastic, substantially linear, aromatic fluoroaliphatic-linked polysulfonate esters.

It is another object of the invention to provide a class of soluble polymers having film-forming properties.

It is another object of the invention to provide a process for the preparation of the polymers of the invention.

Still other objects of the invention will become apparent to those skilled in the art from reading this specification.

The aromatic fluoroaliphatic-linked polysulfonate esters of the invention have repeating units of the formula

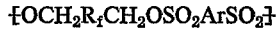

wherein $R_f$ is

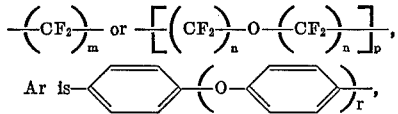

Ar is—,

$m$ is 1 to 8, each $n$ is 2 to 4, $p$ is 1 to 3 and $r$ is 0 or 1.

The polymers are formed by the Friedel-Crafts-catalyzed condensation of a dihydroxy fluoroaliphatic compound (glycol) of the formula $HOCH_2R_fCH_2OH$ with an aromatic disulfonyl chloride of the formula $$XSO_2ArSO_2X$$

(wherein X is halogen, preferably having an atomic weight in the range of 35 to 80, i.e. chlorine or bromine). The reaction can be characterized as follows:

$qXSO_2ArSO_2X + qHOCH_2R_fCH_2OH \rightarrow$
$\{OCH_2R_fCH_2OSO_2ArSO_2\}_q + 2qHX$ wherein X, Ar and $R_f$ are as previously defined and $q$ is an integer. In the case of the higher molecular weight polymers $q$ is from about 10 to 50 or more.

The end groups of the polymers are H when the terminal unit of a polymer chain is —OCH$_2$R$_f$CH$_2$O— and X when the terminal unit is —SO$_2$ArSO$_2$—. Thus the terminal groups in any polymer can be the same or of both of these two types, depending upon the particular terminal units.

Branching and crosslinking can be introduced into the polymers by the addition of other compounds containing more than two hydroxyl groups or more than two aromatic ring-bonded sulfonyl halide groups. Preferably, however, the bifunctional reactants as set out above are utilized alone since they lead to linear soluble thermoplastic polymers.

The glass temperature ($T_g$) of the polymers of the invention vary from below room temperature to 65° C. or higher. Generally those polymers containing relatively long fluoroaliphatic bridging groups have lower $T_g$'s. The polymers are relatively resistant to degradation at high temperatures, generally showing 10% weight loss in air with a 10° C. temperature rise per minute, as measured by the thermogravimetric analysis (TGA) only at 400° C. or above.

The linear polymers of the invention generally have inherent viscosities of not less than about 0.2 (when measured as 1% solutions in dimethylformamide at 25° C.) and they are soluble in concentrations up to 10% in phenol at 175° C., which indicates their substantially linear non-crosslinked nature. Generally they are also soluble in such polar solvents as acetone, N-methylpyrrolidinone, N,N'-dimethylformamide, dimethylsulfoxide, pyridine, etc., which are well suited for casting and the spinning of fibers.

The linear polymers have uses in numerous areas of application. They can be molded, extruded, drawn, oriented and/or otherwise formed into articles including three dimensional shapes, films and filaments by conventional methods used to shape thermoplastic resins without serious degradation; and the articles thus produced have useful strength, toughness, flexibility and good appearance. They can be used as glass fiber and cloth laminants, and as adhesives or coatings to impregnate the surfaces of various other materials and/or to form surface films thereon. They are useful as wire coatings, tubes, pipes, sheets and the like and they can be filled using particulate or fibrous fillers. They are particularly useful as electrical insulating materials and particularly where corrosive and severe (high temperature) ambient conditions are found. They retain their dielectric properties at high temperatures and are suitable, for example, to insulate wire used in transformers or as capacitor dielectric separators.

The branched and crosslinked polymers of the invention can be formed (before, or in some cases, after branching or crosslinking) into three dimensional shapes which are also useful as dielectrics. Also, in pulverulent form, they can be used to fill the linear polymers of the invention or other similar materials, such filled materials also being useful as dielectrics.

The process of preparing the polymers of the invention is carried out utilizing either melt condensation or solution condensation procedures and is preferably carried out under inert conditions, e.g. under a nitrogen atmosphere. To effect the polycondensation, the monomers or comonomers are first heated (generally in the presence of an inert solvent) to a temperature sufficient to obtain a uniform melt. Commonly this is achieved at temperatures ranging from 100 to 200° C. although temperatures ranging from about 25° to 250° may be used. The condensation catalyst is then added and the mixture is maintained at a temperature in the range of from about 100 to 250° C. for from about 1 hour to 48 hours or more, to complete the polymerization. The purpose of the inert solvent is to increase the fluidity of the reaction mixture. Suitable solvents include chlorinated aliphatic and aromatic hydrocarbons, e.g. s-tetrachloroethane, methylene chloride, and Arochlors (highly chlorinated biphenyl and diphenyl ethers), etc.; aliphatic and aromatic sulfones such as dimethylsulfone, tetramethylenesulfone, p,p'-dichlorodiphenylsulfone, etc.; or aliphatic and aromatic nitro compounds such as 1-nitropropane, 3,4'-dichloronitrobenzene, etc. The preferred solvent is (dry) nitrobenzene.

Effective condensation catalysts are anhydrous Lewis acids, also known as Friedel-Crafts-catalysts, such as ferric chloride, indium trichloride, aluminum chloride, zinc chloride, the chlorides of antimony, molybdenum, gallium, etc. Anhydrous hydrofluoric acid or trifluoromethanesulfonic acid may also be used as catalysts. The particularly preferred catalysts are iron and indium chlorides. The preferred catalysts are generally found to be effective in amounts of from about 0.05 to about 0.5 mole per mole of reactive sulfonyl halide group present. Greater proportions of catalysts may be utilized but this is generally unnecessary and is ordinarily avoided, since larger amounts can adversely affect the degree of polymerization, and the separation of the catalyst from the polymer may prove difficult.

The following examples are intended to illustrate the present invention but no limitation as to the scope of the invention are implied thereby. All parts are by weight therein unless otherwise specified. The inherent viscosities of the polymers are measured as 1 percent solutions (w./v.) in dimethylformamide at 25° C. and the glass transition temperatures ($T_g$) are determined by differential thermal analysis (DTA). The resistances of the polymers to degradation at high temperatures are measured by thermogravimetric analysis (TGA), i.e. by continuously measuring the loss of weight of a sample of the polymer while heating it in air at a rate of 10° C. per minute from ambient temperature.

THE INTERMEDIATES

The following intermediates (A–F) are known to the art:

| Designation | Structure |
|---|---|
| A | $HOCH_2(CF_2)_3CH_2OH$ |
| B | $HOCH_2(CF_2)_4CF_2OH$ |
| C | $(HOCH_2CF_2CF_2)_2O-$ |
| D | $HOCH_2(CF_2)_2O(CF_2)_4O(CF_2)_2CH_2OH$ |
| E | 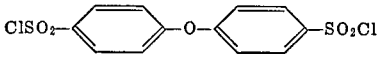 $ClSO_2-\bigcirc-O-\bigcirc-SO_2Cl$ |
| F | $ClSO_2-\bigcirc(SO_2Cl)$ |

Example 1

The reaction of compounds D and E.

A mixture of glycol D (4.9413 g., 0.01 mole) and disulfonyl chloride E (3.6723 g., 0.01 mole) dissolved in 9 ml. of nitrobenzene was heated at 125° C. for 15 minutes under nitrogen. One ml. of a 10% solution of anhydrous ferric chloride in nitrobenzene was then added. Almost immediately a very vigorous evolution of HCl was observed. After 2 hours (when the HCl evolution had ceased) the reaction mixture was cooled, 10 ml. of acetone was added and the polymer was precipitated by pouring into rapidly stirred methanol. The polymer was once more dissolved in acetone and reprecipitated in methanol. The finely divided polymer was finally dried in a vacuum oven for 2 hours. Films were formed by hot pressing at 200° F. under pressure.

The following test data on the (elastomeric) product were obtained:

Inherent viscosity, 0.24; tensile strength 800 p.s.i. at 800% elongation; isothermal aging at 400° F., 6% weight loss in 4 weeks; isothermal aging at 500° F., 38% weight loss in 66 hours; $T_g$, 7–14° C.; TGA 10% weight loss in air 450° C.

Examples 2–5

The polysulfonate esters listed in the following table were prepared by reacting the indicated intermediate compounds utilizing substantially the procedure of Example 1. The data characterizing the resulting linear polymers is also included in the table.

| Example No. | Intermediates | $T_g$, °C. | TGA, 10% wt. loss in air, °C. | Remarks |
|---|---|---|---|---|
| 2 | A and E | 59–65 | 400 | A tough thermoplastic. Films pressed at 250° F. |
| 3 | B and E | | | A tough thermoplastic. Inherent viscosity 0.35. |
| 4 | C and E | 33–38 | 450 | A tough thermoplastic. Films pressed at 250° F. |
| 5 | A and F | | | A tough thermoplastic. Films pressed at 275° F. |

What is claimed is:

1. Aromatic fluoroaliphatic-linked polysulfonate esters having repeating units of the formula $$\{OCH_2R_fCH_2OSO_2ArSO_2\}$$

wherein $R_f$ is

$$-(CF_2)_m- \text{ or } -[(CF_2)_n-O-(CF_2)_n-]_p,$$

Ar is 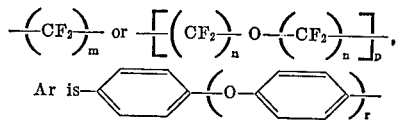

$$-\bigcirc-(O-\bigcirc)_r$$

$m$ is 1 to 8, each $n$ is 2 to 4, $p$ is 1 to 3 and $r$ is 0 or 1 said polymers having inherent viscosities of not less than about 0.2 when measured as 1 percent solutions in dimethylformamide at 25° C.

2. A thermoplastic, substantially linear polymer according to claim 1.

References Cited
UNITED STATES PATENTS 3,335,163  8/1967  Tesoro et al. _____ 260—456
3,337,512  8/1967  Hall _____ 260—79.3

DONALD E. CZAJA, Primary Examiner

M. J. MARQUIS, Assistant Examiner

U.S. Cl. X.R.

117—61 R; 260—47 R, 79, 79.3 R, 79.3 M